3,451,149
EARTH MOVER WITH GAS EJECTING MEANS
COOPERATING WITH DIGGING EDGE
Robert J. Munsch, Glendora, Calif., assignor to Munsch
Research and Development Corporation, a corporation
of California
Filed Dec. 10, 1965, Ser. No. 513,056
Int. Cl. E02f 3/76
U.S. Cl. 37—141                               2 Claims

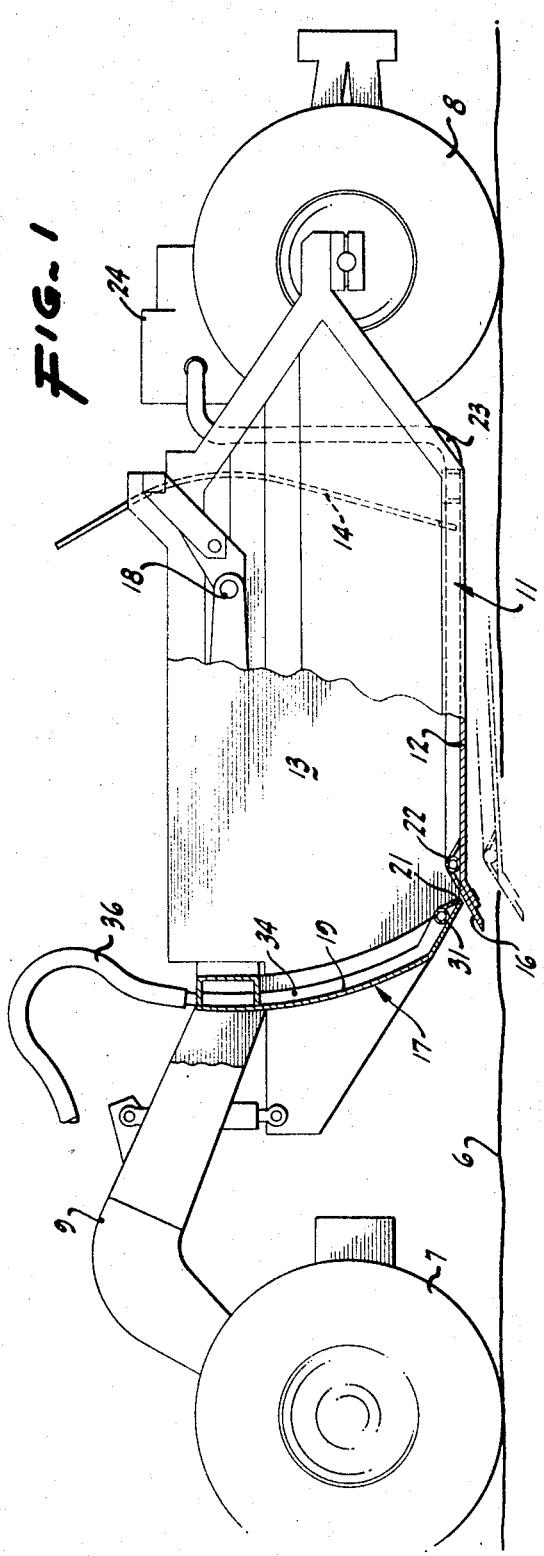
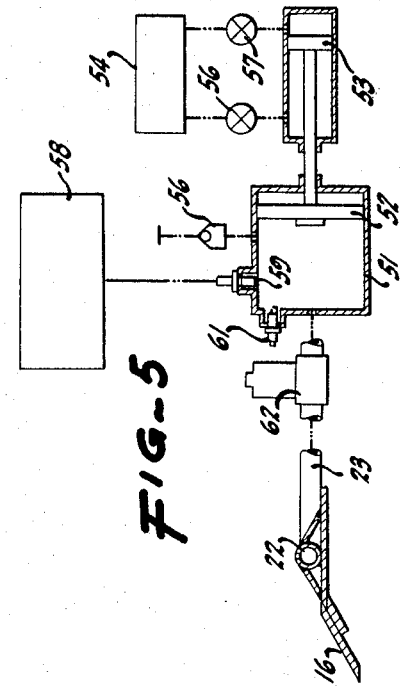
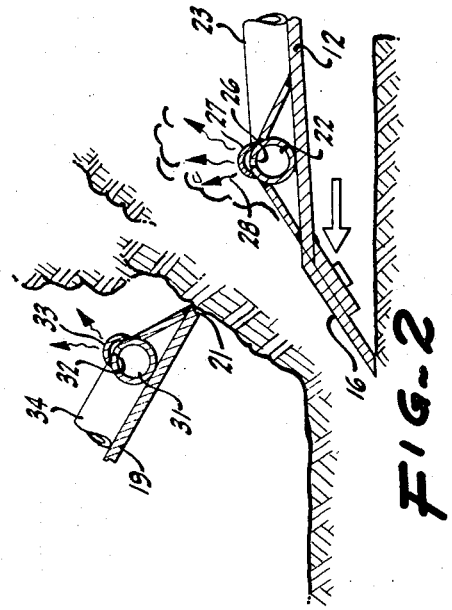
INVENTOR.
ROBERT J. MUNSCH
BY
Lothrop & West
ATTORNEYS

United States Patent Office 3,451,149
Patented June 24, 1969

ABSTRACT OF THE DISCLOSURE

As an earth moving machine advances over the ground, a lower cutting edge on the machine cuts into the ground and the dislodged earth moves upwardly and rearwardly past the edge and onto a bowl or blade. Accumulation of the earth on the bowl or blade results in greatly increased power requirements. By injecting gas upwardly into the earth adjacent the cutting edge the power required to advance the machine over the ground is markedly reduced. Gas injection is made continuous or pulsating depending on the nature of the earth being moved.

---

My invention relates primarily to earth moving devices such as scrapers, bulldozers and the like in which earth from a ground site is excavated and loaded into a carrier bowl in the first instance, or is simply pushed in the other instance. Particularly in connection with an earth moving scraper, it is customary to provide a wheeled frame advanced over the earth by power and to lower a cutting edge or blade into cutting position in the earth. Dislodged earth travels rearwardly and upwardly over the cutting edge into a main bowl. Usually a front apron is provided on the frame in advance of the main bowl and of the cutting edge. The front apron is movable, usually in an arcuate path, toward and away from the cutting edge to provide an intervening throat through which the excavated earth travels. Excavated earth not only flows upwardly and rearwardly into the main bowl as the scraper advances, but as the bowl begins to fill, earth moves or rolls forwardly as well and is caught by and retained in the front apron. At the completion of the excavating cycle, the cutting blade is lifted and the front apron is lowered until they meet, thus closing the earth carrier. For subsequent discharge, the apron is lifted and the cutting edge is disposed at the desired height above the ground. Usually there is a pusher or ejector moved from the rear end of the main bowl forwardly during the discharge operation to dislodge earth over the cutting edge and onto the subjacent ground. A bulldozer rolls earth forwardly ahead of the machine blade as the cutting edge dislodges it. The earth material rides over the cutting edge and up the usually concave bulldozer blade. In these various operations, the movement of the earth immediately after dislodgment from its natural site by the bulldozer or scraper blade and into the bowl of the scraper or later out of the scraper bowl is an operation requiring a great deal of power. A machine which will operate for most excavating purposes with a normal amount of power customarily requires extra engines or pusher tractors to assist in the final loading step.

It is therefore an object of my invention to provide an earth mover and a method of operating an earth mover in which the power required particularly for the final portion of the earth loading operation is greatly reduced and preferably to dispense with an extra power device.

Another object of the invention is to provide an earth mover and method of operating an earth mover in which the loading of earth into the machine is greatly expedited and the discharge of earth from the machine is likewise facilitated.

Another object of the invention is to provide a machine in which the movement of the earth within the machine itself is made easier and smoother.

Another object of the invention is to provide a means for expediting the loading and unloading of earth without substantially increasing the complexity of the now relatively standard mechanism and with the addition of but a simple structure and a simple operating step.

Another object of the invention is to provide an improved method of loading and unloading earth.

Another object of the invention is to provide an improved earth mover which can easily be manufactured, maintained and serviced by people familiar with present-day earth movers.

Other objects of the invention are attained in the embodiment of the invention described in the accompanying description and illustrated in the accompanying drawings, in which:

FIGURE 1 is a cross section through a typical form of earth mover or scraper, the section being a longitudinal one on a vertical plane and showing the scarper in carrying position;

FIGURE 2 is a cross section on the same plane as FIGURE 1 and showing some of the parts adjacent the loading and unloading portion of the scraper to an enlarged scale, the parts being in a loading position;

FIGURE 5 is another diagram showing another form of device for supplying gas under pressure.

Figure 3:
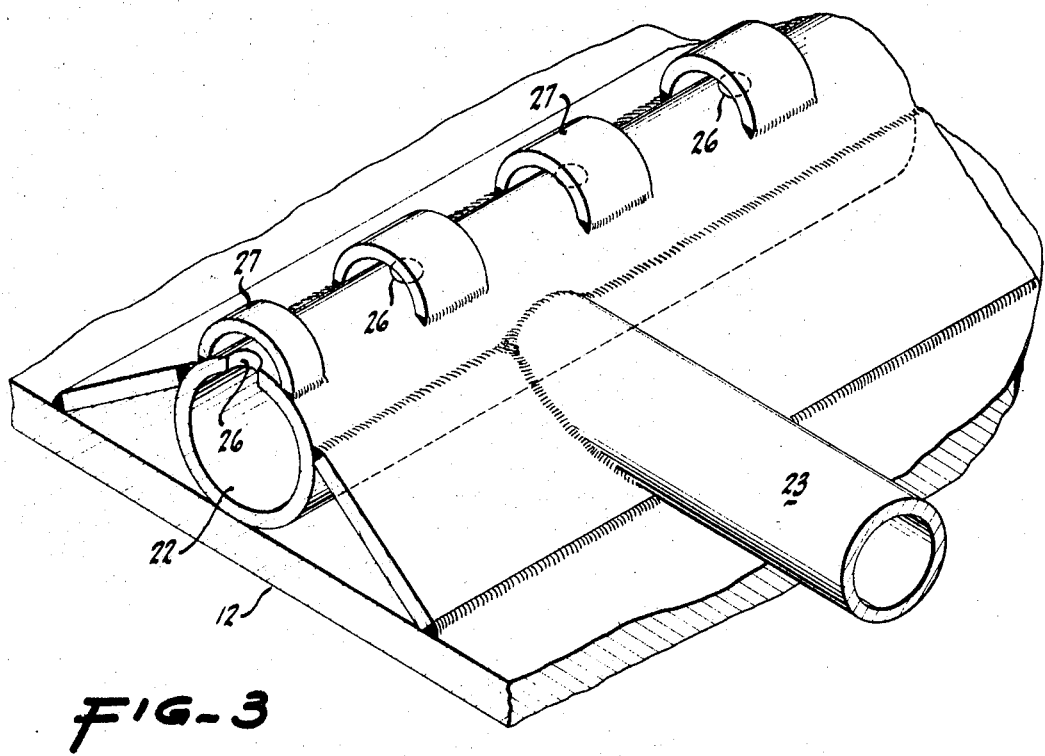
FIGURE 3 is an isometric view of a portion of an earth mover adjacent an edge over which earth travels, with portions of the structure broken away to reduce the size of the figure.

While the subject matter of the invention can readily be embodied in numerous different forms of earth movers, it is for convenience embodied herein in an earth moving scraper. This is a vehicle adapted to operate on the ground 6 and is supported thereon by forward wheels 7, rearward wheels 8 and a connecting frame 9. The scraper has a main bowl 11 having a bottom 12, a pair of side walls 13 and a rear wall 14 which can constitute a pusher movable to and fro over the bottom wall 12. At its leading edge, the bottom wall 12 is provided with a blade or cutting edge 16 adapted to be moved between an upper carrying or spreading position such as shown by the full lines in FIGURE 1 and a lower excavating position such as shown by the broken lines in FIGURE 1.

Also included as part of the scraper construction is a front apron 17 movable about a transverse axis 18 toward and away from the cutting edge 16. The apron includes a forward wall 19, usually arcuate, having a bottom edge 21. The interrelationship and operation of the parts of the scraper is standard and forms no part of the present invention and so is not described in detail.

Pursuant to the invention, one of the edges; 16, for example, such as the forward edge of the scraper bottom, bounded or demarked by the cutting blade 16, is provided with means for assisting the inflow and outflow of the excavated earth. On the scraper bottom 12 extending transversely thereof is a duct 22. This can be built into the original scraper or can be later applied as a section of circular pipe closed at its far end and at its near end joined by a conduit 23 to a source of gas; for example, air under pressure derived from an appropriately driven air compressor 24.

The duct 22 along its length and spaced transversely of the scraper is at intervals provided with individual openings 26 directed generally upwardly and in many instances partially covered and protected by arcuate guards 27 overlying the openings 26 but themselves of short length and thus open at their two ends. With this arrangement, atmospheric air, compressed above atmospheric pressure by the power-driven compressor 24, is supplied through the conduit 23 to the cross duct 22 from which the air flows through the openings 26 and escapes from beneath the guards 27. This gas escaping under pressure rises generally in the direction of the arrows 28 and tends to lift the earth which is moving over the edge 16 adjacent the duct 22.

The released air under pressure has several functions. It tends mechanically to lift and partially to separate some portions of the moving earth, giving it an easier inflow to or outflow from the scraper bowl. Also, the released air serves somewhat as a bearing or antifriction support beneath the moving earth. The air also acts to reduce the specific gravity or density of parts of the earth load. The net result of the air streams is to assist in the movement of the earth over the edge 16. This is particularly important during the latter portion of the loading cycle when normally the earth has such a mass and moves so sluggishly not only with respect to itself but with respect to the bottom and walls of the scraper that great additional power is needed to continue the scraper advance. This additional power is not due to any greater cutting resistance since that remains substantially constant, but the greater load of earth already in the bowl greatly impedes the inward movement of the just-excavated earth and requires great additional propulsive power. With the use of the introduced air, the earth particles not only move more freely amongst themselves, but also move more freely over the confines of the scraper.

In the usual scraper operation, after the scraper bowl is partially filled, the incoming earth rolls forwardly onto the partly open front apron 17 and subsequent incoming earth then also flows over the edge 21 and into the apron. Adjacent the edge 21 there is a cross duct 31 having openings 32 therein protected by guards 33 open at their ends. The duct 31 is joined by a conduct 34 to a flexible hose 36 leading ultimately to a source of gas under pressure such as the compressor 24. With this arrangement, the apron can be raised and lowered as usual, but when earth is flowing over the edge 21, its movement is greatly facilitated by the air currents ejected beneath it. In practice it has been found that in certain soils, at least, the amount of power necessary to advance the scraper especially during final loading when the air mechanism is utilized in approximately half of the force otherwise necessary in the same soil.

In addition to the compressor, the air system can include a storage tank of the usual sort. I have also found that it is sometimes advantageous to include in the air system an automatically operating valve for pulsing the air travelling from the openings 26 and 32. The pulsing air flow, meaning a series of spaced, frequently repeated bursts, is nearly as effective as continuous air ejection and conserves on compressed air and the horsepower required to provide it.

Figure 4:
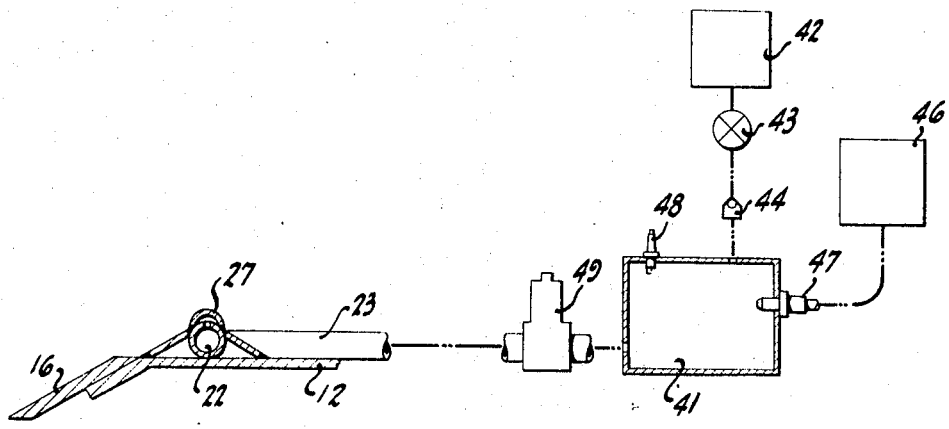
FIGURE 4 is a diagram partly in cross section showing one form of mechanism for supplying gas under pressure.

In addition to utilizing atmospheric air directly, I sometimes find it advantageous to utilize as a gas the products of combustion of atmospheric air and a suitable fuel. As particularly shown in FIGURE 4, for example, the conduit 23 instead of being connected to an air compressor such as 24 is connected to a combustion chamber 41. Air from a source 42 under some pressure is controlled by a settable valve 43 and at a proper time flows in an inward direction past a check valve 44 to the combustion chamber 41. Fuel such as gasoline or diesel oil in a tank 46 is discharged at an appropriate time through a nozzle 47 into the combustion chamber. In the event spark ignition is utilized, a spark plug 48 is provided and is connected to the usual electrical mechanism. In the event compression ignition is utilized, the spark plug 48 and its attendant mechanism is omitted.

In the operation of this structure, a charge of air is introduced into the combustion chamber 41 and a charge of fuel is introduced thereinto as well and ignites. The resulting combustion produces a supply of gas released through a relief and control valve 49 into the conduit 23. The valve 49 can be suitably controlled either to permit the products of combustion to leave in a pulsating fashion or to leave continuously and under the desired pressure. Although not shown, automatic control structures can be provided for the combustion mechanism so that a supply of gas is automatically available when needed.

In a comparable fashion, I sometimes alternatively provide an arrangement such as shown in FIGURE 5. In this instance, the conduit 23 is joined to a combustion chamber 51 in which a piston 52 is reciprocable under the influence of a hydraulic cylinder and piston device 53. This device is supplied with hydraulic fluid from a pressure reservoir 54 controlled through valves 56 and 57 by a cycling mechanism so that the piston 52 is reciprocated at the appropriate times. When the piston 52 is drawn in, a supply of atmospheric air is pulled through a check valve 56 into the cylinder 51 and a supply of fuel from a tank 58 is likewise introduced into the combustion chamber 51 through a suitable discharge device 59. A return piston stroke compresses the mixture. A spark plug 61 ignites the combustible mixture.

The ignited mixture constitutes a supply of gas under superatmospheric pressure within the combustion chamber 51. This gas is then discharged through a check and pulse controlling valve 62 in the conduit 23 so that a stream of gas is delivered to the cross duct 22. When the gas supply in the combustion chamber 51 is substantially depleted, the hydraulic structure 53 is again cycled in order to repeat the operation.

With any of the versions of the device, the practice of the method is to discharge streams or charges of gas such as air under superatmospheric pressure either continuously or in pulses or in cycles into and beneath the earth moving over the adjacent edge of the earth mover or scraper. This assists the earth in moving in either direction since it reduces the friction between the earth and the adjacent structure, lightens the earth mass and also affords reduced friction within the earth mass itself. The same considerations apply to the application of a duct such as 22 to a bulldozer. The duct is applied adjacent the cutting edge of the bulldozer, usually along the lower forward margin thereof, and assists the detached or excavated earth in flowing over the edge and over the upper, usually concave surface of the bulldozer blade.

What is claimed is:
1. An earth mover comprising:
(a) a frame;
(b) means providing an edge on said frame over which earth moves as said earth mover is operated;
(c) a duct on said frame adjacent to and opening above said edge to the atmosphere;
(d) means for supplying said duct with gas under more than atmospheric pressure; and,
(e) means for selectively operating said gas supplying means intermittently to provide a pulsating discharge of gas through said duct.

2. An earth mover as in claim 1 in which said duct has openings extending generally upwardly and means are provided for overlying said openings in spaced relation and inhibiting entrance of earth into said openings.

References Cited

UNITED STATES PATENTS

| | | | |
|---|---|---|---|
| 281,415 | 7/1883 | Stone | 37—62 |
| 609,350 | 8/1898 | Jones | 37—61 |
| 909,543 | 1/1909 | Carlesimo | 37—61 |
| 1,180,664 | 4/1916 | Littlehales | 37—62 |
| 1,314,793 | 9/1919 | Ebeling | 37—62 |
| 1,410,939 | 3/1922 | McArdle | 37—61 X |
| 1,415,113 | 5/1922 | Phillips | 37—61 X |
| 2,178,265 | 10/1939 | Peterson | 37—63 X |
| 2,252,763 | 8/1941 | French | 37—126 |
| 2,718,717 | 9/1955 | Collins | 37—61 |
| 3,014,290 | 12/1961 | Storck | 37—126 |

EDGAR S. BURR, *Primary Examiner.*

U.S. Cl. X.R.

37—118, 129